United States Patent [19]

Walter et al.

[11] Patent Number: 5,204,296

[45] Date of Patent: Apr. 20, 1993

[54] PROCESS FOR INJECTION MOLDING CERAMICS

[75] Inventors: Robert J. Walter, Thousand Oaks; Michael J. Robinson, Simi Valley, both of Calif.

[73] Assignee: Rockwell International Corporation, Seal Beach, Calif.

[21] Appl. No.: 412,957

[22] Filed: Sep. 26, 1989

[51] Int. Cl.$^5$ .............................. C04B 35/58
[52] U.S. Cl. ........................ 501/97; 501/98; 264/63
[58] Field of Search .................. 501/97, 98; 264/63

[56] References Cited

U.S. PATENT DOCUMENTS

| | | | |
|---|---|---|---|
| 3,983,071 | 9/1976 | Jurisch | 524/850 |
| 4,412,008 | 10/1983 | Miyamoto et al. | 501/97 |
| 4,436,789 | 3/1984 | Davis et al. | 524/413 |
| 4,485,182 | 11/1984 | Enomoto et al. | 501/97 |
| 4,624,808 | 11/1986 | Lange | 501/97 |
| 4,671,912 | 6/1987 | Komatsu et al. | 501/97 |
| 4,784,812 | 11/1988 | Saitoh et al. | 264/63 |
| 4,818,615 | 4/1989 | Luxon et al. | 428/378 |
| 4,820,665 | 4/1989 | Ukai et al. | 501/98 |
| 4,870,036 | 9/1989 | Yeh | 501/98 |
| 4,906,424 | 3/1990 | Hughes et al. | 264/63 |

Primary Examiner—Mark L. Bell
Assistant Examiner—A. Wright
Attorney, Agent, or Firm—H. Fredrick Hamann; Harry B. Field

[57] ABSTRACT

The process for fabricating ceramic bodies which comprises providing a particulate ceramic powder such as $Si_3N_4$, and adding a sintering aid such as $SiO_2$ and/or $Y_2O_3$, and providing an aqueous solution of a water soluble plastic binder, particularly poly(2-ethyl-2-oxazoline), and which can include auxiliary components, e.g. a surfactant. The ceramic powder including sintering aids is dispersed in the aqueous solution containing binder, and stirring is continued until the dispersion becomes viscous. The resulting viscous dispersion is then dried to form a mixture of the particulate ceramic material and the binder, and the dried mixture is injection molded, e.g. at temperature of about 400° to 500° F. in an argon atmosphere. The injection molded product is then stripped of the binder by heating at temperature ranging from about 700° to about 850° F., without causing any stripping defects. The stripped ceramic product is then subjected to sintering for solidification and densification.

22 Claims, No Drawings

PROCESS FOR INJECTION MOLDING CERAMICS

BACKGROUND OF THE INVENTION

1. Field of the Invention

This invention relates to the field of ceramics, and particularly to the field of $Si_3N_4$ ceramics.

2. Description of the Prior Art

Ceramic compositions produced from silicon nitride and silicon carbide are the two most advanced ceramic materials presently employed. An advantage that silicon nitride has over silicon carbide is in its lower thermal expansion coefficient which makes silicon nitride more thermal shock resistant.

There is a need for making shaped ceramic bodies such as silicon nitride, having high strength and sufficient fracture toughness, that is free of fracture-initiating defects, for use at temperatures and in environments that severely limit the useful life of metals. There is a high probability that the next generation of advanced turbines will contain ceramic components in order to meet increased temperature requirements dictated by increased performance. The temperature range capability of the currently used nickel and cobalt base superalloys is inadequate to meet these requirements. Refractory metal reinforced super-alloys can extend this range, but still the maximum temperature cannot exceed the superalloy melting temperatures, and they are susceptible to elevated temperature environmental corrosion. Limitations of these metal matrix composites include their comparatively high densities, which increase tensile stresses in rotating components, and reactivity of the refractory metal composites with most elevated temperature turbine environments.

Ceramics such as silicon nitride have the advantage of considerably higher temperature capability than the materials of the current turbine components. Ceramics also have comparatively high strength/weight ratios and are virtually inert in most high-temperature environments.

Currently net shape fabrication of ceramics is achieved mainly by injection molding which involves mixing the ceramic powder and sintering aids with an oil soluble plastic binder and injection of the mixture into a mold cavity. The need for defect-free ceramics is the result of the brittle nature of ceramics. Fracture initiation occurs by crack propogation originating at flaws. Agglomeration is a main source of flaws produced during powder processing in preparation for injection molding. The current method of injection molding using oil soluble plastic binders is not compatible with advanced processing methods which involve aqueous solution dispersion for obtaining a homogeneous ceramic powder-sintering aids dispersion and for removing agglomerates and impurities which produce imperfections that lower the strength and toughness of the ceramics.

SUMMARY OF THE INVENTION

There is provided according to the basic concept of the present invention, a process for producing net shape ceramic parts by injection molding using aqueous solution processing that is compatible with advanced procedures for making homogeneous and defect-free ceramics, particularly silicon nitride. The process was particularly developed for injection molded $Si_3N_4$ which possesses a superior combination of thermal and mechanical properties for elevated temperature applications. The process consists of aqueous solution dispersive mixing of ceramic powder, e.g. $Si_3N_4$, containing sintering aids, with a water soluble plastic binder, drying and injection molding the dispersed plastic-solids mixture, and post mold stripping the plastic binder without producing stripping defects in the molded ceramic.

More particularly, the procedure, according to a preferred embodiment, involves mixing ceramic powder, particularly $Si_3N_4$, with an aqueous solution of a water soluble binder, particularly poly(2-ethyl-2-oxazoline) plastic binder, desiccator drying the mixture, injection molding the mixture to form the desired ceramic part, preferably employing an argon purge, and stripping the plastic binder from the injection molded ceramic part by slow heating, preferably in argon, to 720° F. and in air to 820° F. The stripped ceramic part is then subjected to sintering at elevated temperature in the usual manner.

OBJECTS OF THE INVENTION

It is accordingly an object of the present invention to provide homogeneous and defect-free ceramics, particularly silicon nitride.

Another object of the invention is the provision of a process for producing shaped ceramic parts by injection molding of a ceramic such as $Si_3N_4$ containing a plastic binder, followed by stripping the plastic binder, substantially without producing stripping defects in the injection molded ceramic.

Yet another object is the provision of procedure of the above type for injection molding of a ceramic containing a plastic binder, employing aqueous solution processing of a ceramic powder such as $Si_3N_4$, and a suitable plastic binder.

Other objects and advantages of the invention will be apparent from the following detailed description of the invention.

DETAILED DESCRIPTION OF THE INVENTION AND PREFERRED EMBODIMENTS

The ceramic material employed according to the invention is prferably silicon nitride. However, other ceramic materials such as silicon carbide and aluminum oxide, as well as most other ceramics, can also be utilized.

Sintering aids such as silica (SiO ), yttria ($Y_2O_3$), alumina ($Al_2O_3$), and other known sintering aids can be utilized for incorporation with the ceramic material. A preferred sintering aid is a mixture of $SiO_2$ and $Y_2O_3$. The sintering aid is mixed with the ceramic material in a proportion ranging from about 2 to about 25% of sintering aid by weight of the mixture of the ceramic material, e.g. silicon nitride powder, and the sintering aid. In the preferred practice, the ceramic powder, e.g. $Si_3N_4$, and sintering aids are mixed and if not sufficiently fine, the mixture is ball milled so that the resulting particle size of the powder is preferably of submicron particle size.

The solid mixture of ceramic powder and sintering aids is then subjected to dispersive mixing in an aqueous solution. For this purpose, an aqueous solution of a water soluble plastic binder is provided. The preferred water soluble binder according to the invention is poly(2-ethyl-2-oxazoline) marketed as XUS 40303.00, by Dow Chemical Company. It was unexpectedly found that the use of an aqueous solution of such water soluble binder not only provided high volume loading and dispersion of the ceramic mixture in such aqueous solution, but the presence of such water soluble binder in the ceramic mixture subsequently subjected to injection molding, did not cause undesirable sticking of such mixture to the mold surface. On the other hand, various other water soluble binders such as the "Methocels", a series of methyl-cellulose materials, were tried but were found unsuccessful.

The water soluble binder, particularly poly(2-ethyl-2-oxazoline) is dissolved in a relatively large volume of water, together with certain additional components. These additional components or additives include a polyethylene glycol, such as the material marketed as E-400, having a molecular weight of about 400 and marketed by Dow Chemical Company. A surfactant, such as the surfactant marketed as SPAN 80, believed to be fatty acid partial esters of hexitol anhydrides, or the hydrophilic surfactant, marketed as TWEEN 80, believed to be polyoxyethylene derivatives of fatty acid partial esters of hexitol anhydrides, which are produced by ICI Americas, Inc. of Wilmington, Del. is preferably also included. An additional additive which can be employed with the water soluble binder is a coupling agent such as CPS 071S, an organosilane, marketed by Petrarch Systems, Inc. of Bristol, Pa. The total additives present in the aqueous solution with the water soluble binder can range from about 5% to about 15% by weight of the binder. Thus, the polyethelene glycol component can be present in an amount of about 3 to about 8% by weight of the binder, the surfactant in an amount of about 1 to about 7% by weight of the binder and the coupling agent in an amount of about 1 to about 3% by weight of the binder.

The above polyethylene glycol, surfactant and coupling agent components are optional, and although beneficial, are not essential components.

In order to obtain a proper dispersion of the ceramic powder including sintering aids, in the aqueous solution of water soluble binder, without agglomeration of the solid particles, the pH of the aqueous solution should range from about 7.8 to about 11, a pH of about 10 being particularly preferred. The adjustment of the pH of the aqueous solution can be made by the addition of ammonium hydroxide.

The ceramic powder, e.g. $Si_3N_4$, containing sintering aids is mixed with the aqueous solution containing water soluble binder, using as high a loading of the ceramic powder as possible, while forming a stable dispersion of the ceramic powder in the aqueous solution, without agglomeration of the ceramic powder. It has been found that a proportion or loading of about 40 to about 50% ceramic powder including sintering aids, and about 60 to about 50% of water soluble binder, by volume can be employed. The ceramic powder and sintering aids are mixed and dispersed in the aqueous solution, preferably employing ultrasonic mixing to achieve a more complete and homogeneous dispersion. The solution and dispersion are preferably maintained at about ambient temperature during such mixing.

Mechanical stirring of the dispersion is then continued while evaporating the water for a period of time until the solution becomes quite viscous, e.g. too viscous for stirring to continue. Thereafter, the viscous dispersion is dried by desiccator storage for an extended period in air, or by heating or baking in a vacuum oven, e.g. at 50° C., or using both procedures. Drying of the concentrated dispersion at temperature substantially higher than 50° C. tends to deteriorate the binder. The dried material is preferably stored in a desiccator. The dried mixture of ceramic material and water soluble binder in the volumetric proportions noted above, is then subjected to injection molding in a conventional injection molding machine. Temperature of the material during molding is maintained preferably between about 400° and 500° F. In preferred practice, injection molding is carried out in the presence of argon by argon purging of the injection molding machine barrel. It has been found that injection molding at temperatures above 500° F. is unsatisfactory.

It has been found particularly that in order to obtain a good molded and sintered product, it is necessary to remove substantially all of the water from the mixture of ceramic powder and binder both prior to and after injection molding. If water is present in the material during injection molding, evaporation of water takes place from the mixture and a homogeneous molded product is not obtained. Further, after injection molding, the molded mixture of ceramic powder and binder is stored in a vacuum desiccator to remove any remaining water prior to the stripping operation.

Stripping the plastic binder from the injection molded product is then carried out. In preferred practice, the injection molded product is first embedded in a crucible containing $Si_3N_4$ powder, followed by heating the crucible. The crucible is preferably heated to temperature ranging from about 700° to about 850° F. for a period of time sufficient to remove substantially all of the binder, without producing stripping defects in the injection molded product. According to a preferred mode of operation, heating of the crucible containing the injection molded product can commence from ambient temperature to about 700° F. in argon, or alternatively in a vacuum, followed by heating in air from about 700° F. to about 825° F. for a period of several hours duration. This procedure removes the plastic binder so that it does not deform or delaminate, and without causing any other stripping defects. It was particularly found that desiccator storing the mixture of ceramic material and binder prior to injection molding, and desiccator storing the injection molded product prior to stripping, significantly reduced stripping defects.

The product following post mold stripping and produced according to the invention procedure is dense and homogeneous and even though the binder is stripped away, is essentially non-pourous. However, the ceramic product following stripping does not have substantial strength, and is then subjected to sintering for solidification and densification at sufficiently high temperature, e.g. about 1700° to about 1850° C. Thus, such sintering can be carried out in an air furnace at 1700° C., e.g. for about an hour, or the sintering can be carried out in nitrogen at higher temperatures, e.g. 1800°-1850° C. for 1-2 atm.$N_2$, or at higher temperature for high pressure $N_2$.

The following is an example of practice of the invention. It is understood that this example is only illustrative of the invention and is not intended as limitative thereof.

EXAMPLE

A mixture of 77.5% $Si_3N_4$ powder, 15.5% $Y_2O_3$ and 7% $SiO_2$, the $Y_2O_3$ and $SiO_2$ functioning as sintering aids, was ball milled to produce a ceramic powder of submicron particle size.

An aqueous solution was prepared containing poly(2-ethyl-2-oxazoline), and about 8% E 400 polyethelene glycol, 3% SPAN 80 surfactant and 3% CPS 071S organosilane coupling agent, the percentages of the latter three components being based on the weight of the water soluble binder. Sufficient water was added to achieve a low viscosity fluid consistency. The aqueous solution of soluble binder and additives was adjusted to pH 10 by addition of ammonium hydroxide.

The $Si_3M_4$ powder containing the $SiO_2$ and $Y_2O_3$ sinter aids was then mixed with the aqueous solution containing water soluble binder, using ultrasonic mixing to form a stable uniform dispersion of the ceramic material in the aqueous solution, containing about 50% ceramic material and about 50% binder loading, by volume.

The water was evaporated from the aqueous dispersion while stirring the dispersion with an air driven mechanical stirrer until the solution was too viscous for stirring to continue.

The viscous material was then dried by placing the material in a vacuum oven and baking at 50° C. The resulting dried mixture was then stored in a desiccator for about 72 hours duration.

The dried mixture of ceramic material and water soluble binder having the volumetric loading proportions noted above, was then subjected to molding in an injection molding machine at 400° to 500° F., with argon purging of the injection molding machine barrel. The injection molded product was then stored in a vacuum desiccator awaiting binder stripping.

The desiccator stored injection molded product was then subjected to stripping by first embedding the product in a crucible containing $Si_3N_4$ powder and then heating the crucible from room temperature to 720° F. in argon and then in air from 720° F. to 825° F., and holding in air for about a 16 hour duration. A relatively uniform heating rate of about 10° F./min was maintained throughout the heating cycle. About a 97 to 98.5% removal of plastic binder and associated organic components was removed or stripped from the ceramic product. The resulting product was dense and homogeneous and essentially non-porous following stripping and no delamination or stripping defects were observed in the product.

The product was then subjected to sintering at a temperature of about 1800° C. in a nitrogen environment. A sintered product was obtained having good strength and toughness.

The product produced employing the improved invention procedure for injection molding of ceramics such as silicon nitride, is a sintered product having a superior combination of thermal and mechanical properties for elevated temperature applications.

The improved ceramic products, particularly $Si_3N_4$ products, produced according to the invention process can be employed to manufacture various items of commerce and science. Thus, for example the ceramic products produced according to the invention process can be employed for the fabrication of advanced heat engine structural components such as Diesel engine components and in other structural applications requiring a tough refractory material having a low coefficient of thermal expansion and high thermal shock resistance, such as for nozzle applications in high performance rocket engines, and in the fabrication of combustion chambers.

From the foregoing, it is seen that according to the invention tough ceramic, particularly $Si_3N_4$ ceramic, materials can be produced using an injection molding process for molding a mixture of a ceramic material and a binder, in conjunction with various processing techniques, particularly by use of an aqueous solution containing a water soluble plastic binder for mixing the ceramic powder therein to form an aqueous dispersion, which can then be dried, injection molded, stripped of binder and then sintered.

It is to be understood that what has been described is merely illustrative of the principles of the invention and that numerous arrangements in accordance with this invention may be devised by one skilled in the art without departing from the spirit and scope thereof.

What is claimed is:

1. A process for fabricating ceramic bodies which comprises providing a particulate silicon nitride material, providing an aqueous solution of the water soluble plastic binder, adjusting the pH of said aqueous solution to a range of from about 7.8 to about 11, dispersing said particulate silicon nitride material in said aqueous solution, drying the resulting dispersion to form a mixture of said particulate silicon nitride material and said plastic binder poly(2-ethyl-2-oxazoline), injection molding said mixture, and stripping said plastic binder from the resulting injection molded mixture.

2. The process of claim 1, wherein said particulate silicon nitride material contains a sintering aid.

3. The process of claim 2, wherein said sintering aid is selected from the group consisting of $SiO_2$, $Y_2O_3$ and $Al_2O_3$.

4. The process of claim 2, wherein said sintering aid is a mixture of $SiO_2$ and $Y_2O_3$.

5. The process of claim 1 wherein said plastic binder contains additional components including a polyethylene glycol, a surfactant and a coupling agent.

6. The process of claim 5 wherein said polyethylene glycol has a molecular weight of about 400, said surfactant is a lipophilic surfactant and said coupling agent is an organosilane.

7. The process of claim 2, wherein said sintering aid is present in a proportion of about 2 to about 25%, by weight of the mixture of said $Si_3N_4$ material and said sintering aid.

8. The process of claim 1, the proportion of particulate silicon nitride material and water soluble plastic binder ranging from about 40 to about 50% ceramic powder and 60 to about 50% of said binder, by volume.

9. The process of claim 1, wherein the pH of said aqueous solution is about 10.

10. The process of claim 1, including stirring the aqueous dispersion of said particulate silicon nitride material and said binder and evaporating a substantial amount of water for a period of time to render said aqueous dispersion viscous.

11. The process of claim 10, said drying of said viscous dispersion being carried out by desiccator storage or by vacuum baking at elevated temperature up to about 50° C.

12. The process of claim 1, said injection molding taking place at a temperature ranging from about 400 to about 500° F. in the presence of argon.

13. The process of claim 1, including desiccator storing said mixture prior to the injection molding step and desiccator storing said injection molded mixture prior to the stripping step.

14. The process of claim 1, said stripping being carried out by heating the injection molded mixture at elevated temperature and for a period of time sufficient to remove substantially all of said binder from the injection molded mixture.

15. The process of claim 1, including sintering the injection molded silicon nitride after stripping the plastic binder therefrom.

16. The process of claim 2, including sintering the injection molded ceramic after stripping at temperature ranging from about 1700° to about 1850° C.

17. A process for fabricating ceramic parts which comprises
   ball milling $Si_3N_4$ and a combination of $SiO_2$ and $Y_2O_3$ sintering aids to form a ceramic powder,
   providing an aqueous solution of poly(2-ethyl-2-oxazoline) water soluble binder adjusted to a pH of about 10,
   mixing said powder in said aqueous solution to form a dispersion of said powder in said solution,
   stirring said dispersion and evaporating water therefrom for a period of time until said dispersion becomes viscous,
   drying the resulting viscous dispersion to form a mixture of said powder and said binder,
   injection molding said mixture at temperature ranging from about 400° to about 500° F. in an argon atmosphere, and
   stripping said plastic binder from the resulting injection molded product at elevated temperature ranging from about 700° to about 850° F. for a period of time sufficient to remove substantially all of said binder and substantially without producing stripping defects in said injection molded product.

18. The process of claim 17, wherein said combination of sintering aids is present in a proportion of about 2 to about 25% by weight of the mixture of said $Si_3N_4$ and said sintering aids, the proportion of said ceramic powder and water soluble plastic binder being about 50—50, by volume.

19. The process of claim 18, wherein said binder contains additional components including a polyethylene glycol, a surfactant and a coupling agent, and wherein said polyethylene glycol has a molecular weight of about 400, said surfactant is a lipophilic surfactant and said coupling agent is an organosilane coupling agent, the proportions of said additional components in said binder ranging from about 5 to about 15% by weight of said binder.

20. The process of claim 17, said stripping including embedding the injection molded product in a crucible containing silicon nitride powder, heating said crucible from room temperature to 720° F. in argon and from 720° F. to 825° F. in air for several hours.

21. The process of claim 17, said drying of said viscous dispersion being carried out by desiccator storage or by vacuum baking at elevated temperature up to about 50° C., and including desiccator storing said injection molded mixture prior to the stripping step.

22. The process of claim 17, including sintering the injection molded product after stripping the plastic binder therefrom.

* * * * *